United States Patent
McNaughton et al.

(10) Patent No.: US 7,309,201 B2
(45) Date of Patent: Dec. 18, 2007

(54) PROVIDING AUTOMATED DELIVERY OF CATALYST AND/OR PARTICULATE TO ANY FILLING SYSTEM DEVICE USED TO FILL TUBES

(75) Inventors: Michael D. McNaughton, El Lago, TX (US); Edmund Lowrie, Seabrook, TX (US)

(73) Assignee: Catalyst Services, Inc., La Porte, TX (US)

( * ) Notice: Subject to any disclaimer, the term of this patent is extended or adjusted under 35 U.S.C. 154(b) by 0 days.

(21) Appl. No.: 11/643,227

(22) Filed: Dec. 21, 2006

(65) Prior Publication Data

US 2007/0154290 A1 Jul. 5, 2007

Related U.S. Application Data

(60) Provisional application No. 60/752,298, filed on Dec. 21, 2005.

(51) Int. Cl.
*B65G 25/00* (2006.01)
*B65G 67/16* (2006.01)
*B66C 17/08* (2006.01)

(52) U.S. Cl. .................. 414/160; 414/171; 414/804

(58) Field of Classification Search ........ 414/160–164, 414/167, 171, 800, 804
See application file for complete search history.

(56) References Cited

U.S. PATENT DOCUMENTS

| | | | |
|---|---|---|---|
| 4,402,349 A | 9/1983 | Engert et al. |
| 4,402,643 A | 9/1983 | Lytton et al. |
| 4,461,327 A | 7/1984 | Magin et al. |
| 5,890,868 A | 4/1999 | Comardo |
| 5,897,282 A | 4/1999 | Comardo |
| 6,132,157 A | 10/2000 | Comardo |
| 6,981,529 B2 | 1/2006 | Fry |

*Primary Examiner*—Christopher J. Novosad
(74) *Attorney, Agent, or Firm*—Mark A. Oathout

(57) ABSTRACT

Automation of the delivery of a particulate to a tube contained in a reformer type heater with vertical tubes is disclosed and includes a hopper having an opening at the lower end. A slide gate is mounted on the hopper and selectively projects over the opening in the hopper. A box mounted below the hopper. A primary ramp is mounted in the box and underlaps the opening in the hopper. The primary ramp has an angle of inclination and extends to a lower end of the box. The primary ramp also has a screen. A cone is connected to the box proximate to one end of the primary ramp and a tube is connected to the lower end of the cone for conveying particulate to a tube loading adaptor. A dust collection cone is connected to the box underlapping the primary ramp and a discharge port is connected to the lower end of the dust collection cone. The tube loading adaptor is positioned for connection to the tube in the reformer type heater with vertical tubes. A vibrator is connected to the box.

29 Claims, 3 Drawing Sheets

PROVIDING AUTOMATED DELIVERY OF CATALYST AND/OR PARTICULATE TO ANY FILLING SYSTEM DEVICE USED TO FILL TUBES

CROSS-REFERENCE TO RELATED APPLICATIONS

This application claims the benefit of U.S. provisional application No. 60/752,298 filed Dec. 21, 2005.

FEDERALLY SPONSORED RESEARCH OR DEVELOPMENT

Not applicable.

REFERENCE TO LISTING, TABLES OR COMPACT DISK APPENDIX

Not applicable.

BACKGROUND

Catalyst is loaded into tubes within a reformer, heater or reactor vessel. The loading is typically a precursor to carrying out a reaction within such vessel. It is helpful to improve the efficiency of the loading process in order to improve the efficiency of the resulting reaction and to speed up the catalyst loading and clean-up processes.

SUMMARY

Automation of the delivery of a particulate to a tube contained in a reformer type heater with vertical tubes is disclosed and includes a hopper having an opening at the lower end. A slide gate is mounted on the hopper and selectively projects over the opening of the hopper. A box is mounted below the hopper. A primary ramp is mounted in the box and underlaps the opening in the hopper. The primary ramp has an angle of inclination and extends to a lower end of the box. The primary ramp also has a screen. A cone is connected to the box proximate to one end of the primary ramp and a tube is connected to the lower end of the cone for conveying particulate to a tube loading adaptor. A dust collection cone is connected to the box underlapping the primary ramp and a discharge port is connected to the lower end of the dust collection cone. The tube loading adaptor is positioned for connection to the tube in the reformer type heater with vertical tubes. A vibrator is connected to the box.

The terms or phrase "reformer type heater with vertical tubes" as used in the various descriptions and the claims shall mean a steam/methane reformer, steam/naphtha reformer, direct reduction heater or like furnace containing a catalyst or particulate material for gas production.

The objectives to be attained through the various embodiments and procedures disclosed include:

A device and techniques are needed that can eliminate the inconsistencies and human error related to delivering catalyst or particulate to any existing tube loading systems for loading tubes.

A device and techniques are needed that is free standing and can work on any design or configuration of tubes regardless of the manufacturer of the tubes.

A device and techniques are needed that can automatically and repeatably provide catalyst or particulate to a filling system for loading tubes utilizing electronic controls and a vibrator.

A device and techniques are needed that can automatically remove dust and fines from catalyst or particulate as it passes through the device.

A device and techniques are needed that can be adjusted by volume and filling speed matched to the internal diameter of any tube for the delivery of catalyst or particulate to any existing filling systems for loading tubes.

A device and techniques that is sufficiently versatile that it can be manually operated in a similar manner in the event that there is a vibrator or electronic controls failure.

A device and techniques is needed that can be operated by one individual thereby reducing the requisite amount of manpower to staff a tube filling project.

A device and techniques are needed that are as fast as or faster than existing delivery methods and are simple to use.

BRIEF DESCRIPTION OF THE SEVERAL VIEWS OF THE DRAWING(S)

DETAILED DESCRIPTION OF THE PREFERRED EMBODIMENTS(S)

Figure 1:
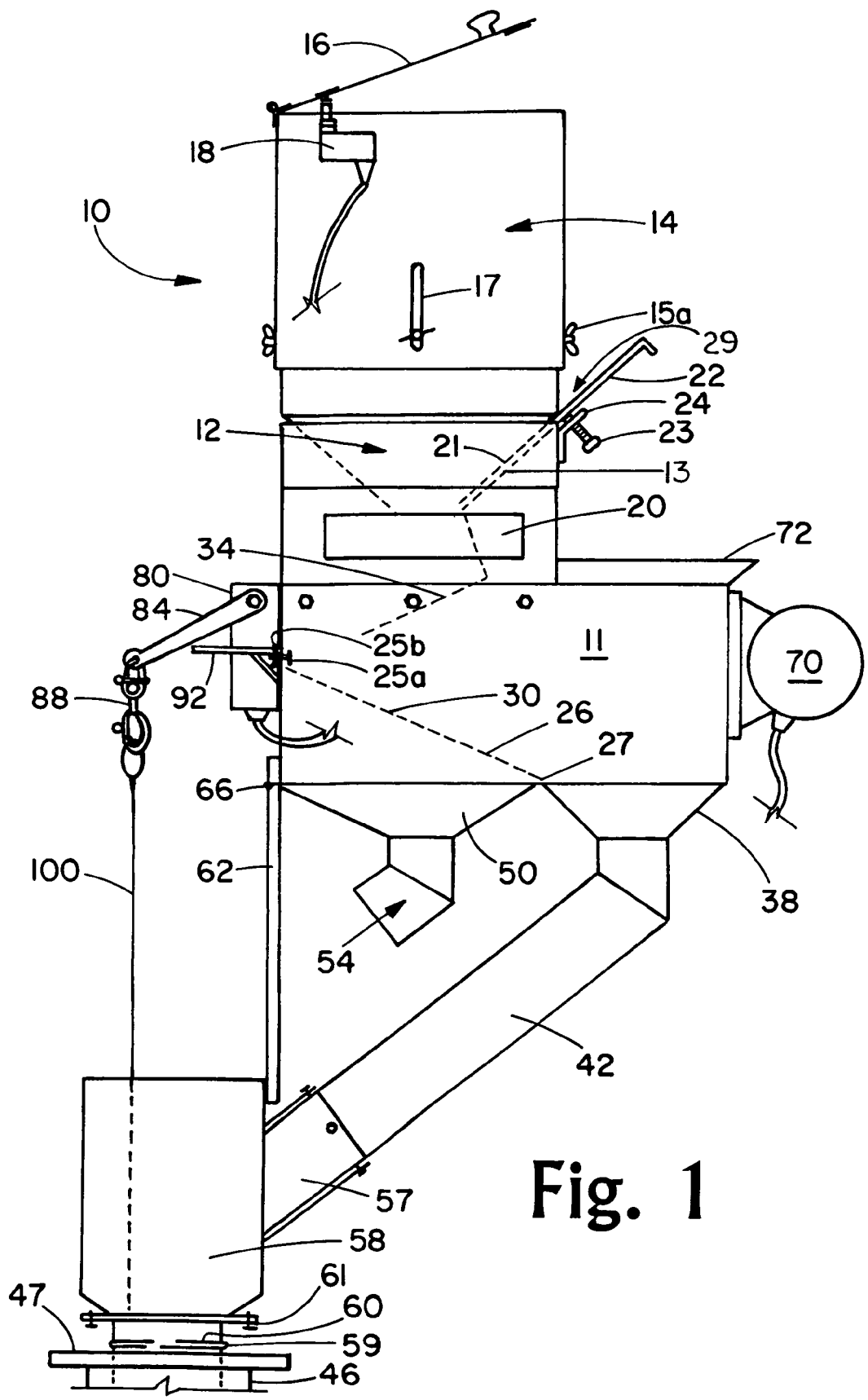
FIG. 1 is a schematic elevational view of one embodiment with the automated filling delivery device holding a tube loading system/rope with the lower end of the funnel being inserted into a tube.
Figure 2:
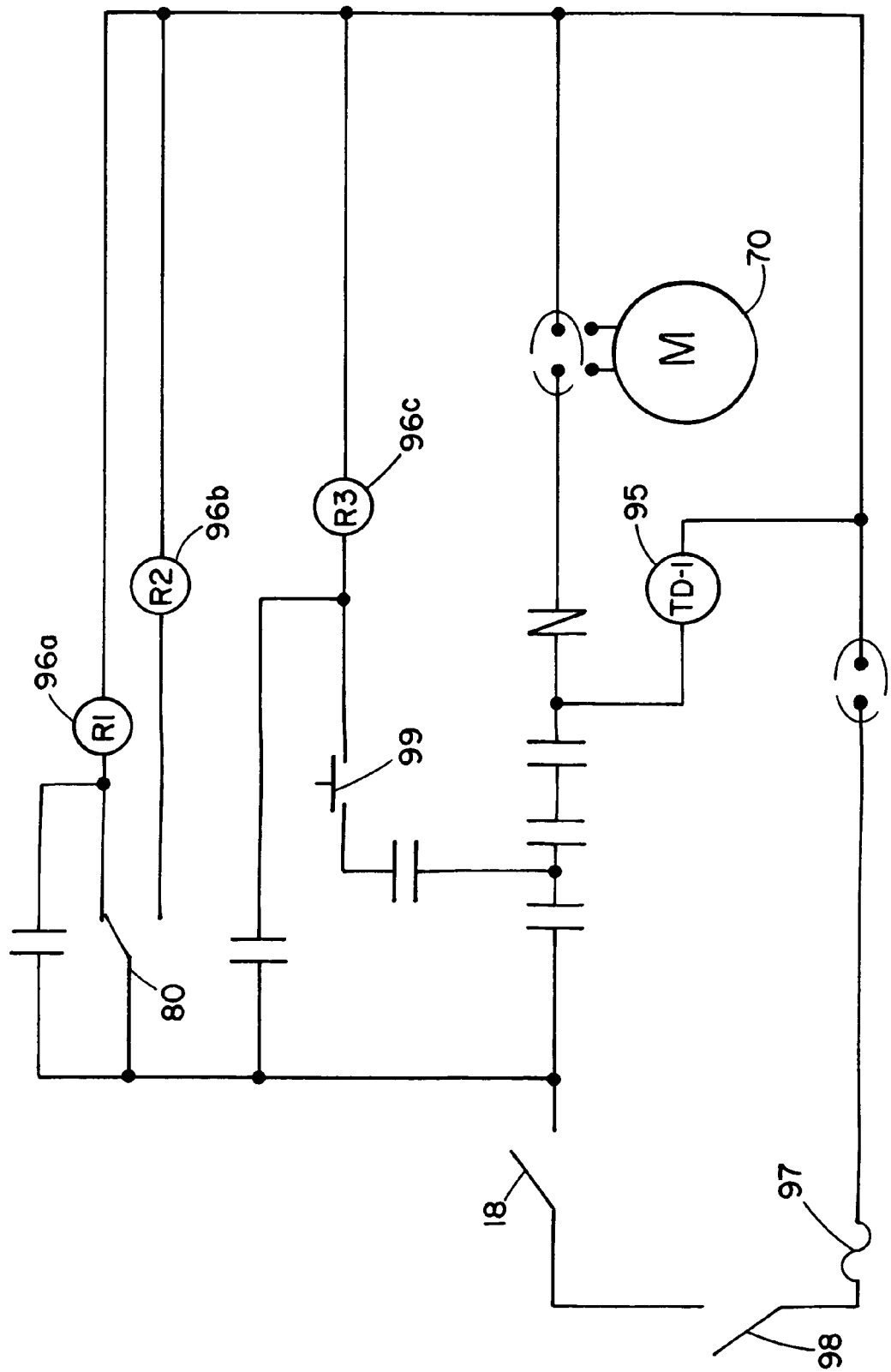
FIG. 2 is a schematic of the electronic components of one embodiment of the control system for the automated filling delivery device.
Figure 3:
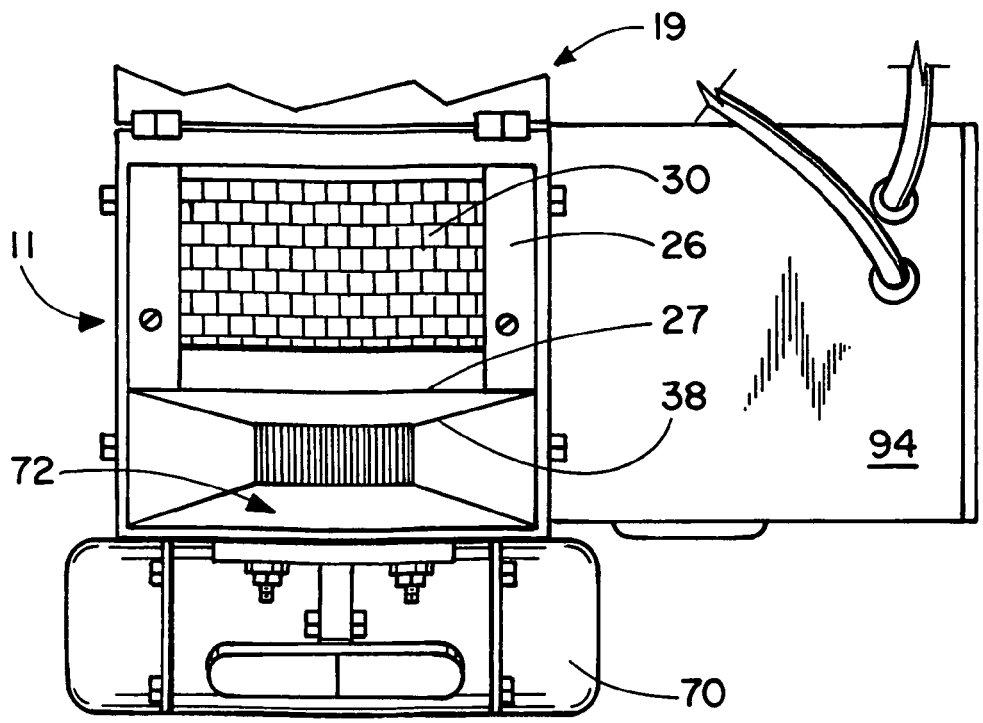
FIG. 3 is a top view toward the "top off" chute showing the primary ramp and screen in one embodiment.

Referring to FIGS. 1-4, one embodiment of the automated filling delivery device 10 is shown. Other embodiments are functional for the intended purpose of the device, some but not all of which by way of further example are discussed below.

In one embodiment, the automated filling delivery device 10 consists of the following main components: A volumetrically adjustable receiving hopper 12 with a hinged lid 16 at the top end, and with a reset switch 18. The hopper 12 has funneled shaped piece 21 that defines an opening at the lower end. Handle(s) 20 may be located on the neck 19 of the hopper 12 and can be used to vibrate the automated filling delivery device 10. One or more hopper extension pieces (in the form of a chute) 14 may be mounted on top of the receiving hopper 12 for volumetric adjustment.

Figure 4:
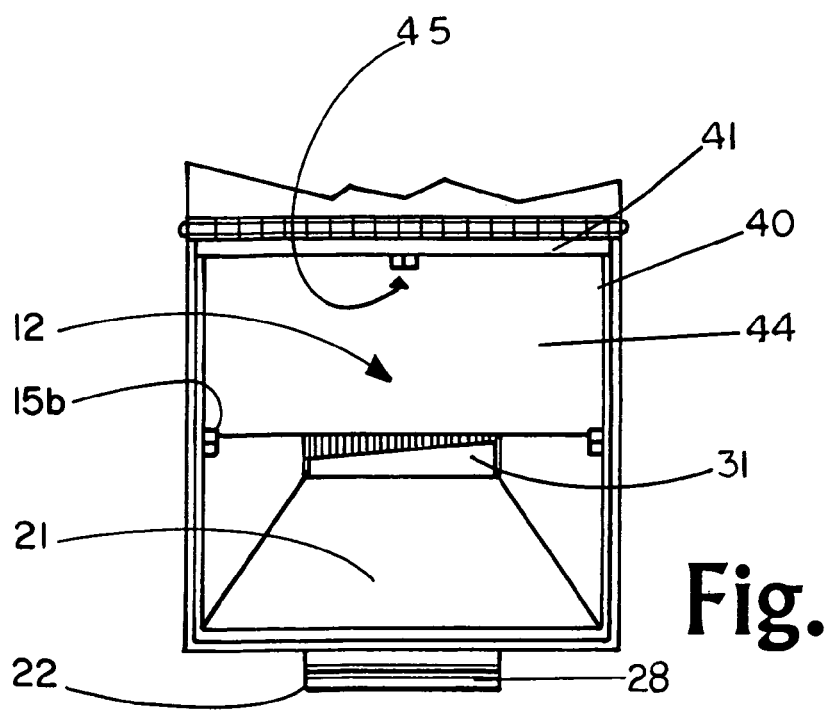
FIG. 4 is a top view of the automated filling delivery device toward volumetrically adjustable receiving hopper in one embodiment.

An adjustable flow control slide gate 22 is mounted through a horizontal slit 29 in the wall of the hopper 12. The slide gate 22 selectively projects over the opening at the lower end of the hopper 12. Two guides 13 form a track for the slide gate 22. The guides 13 are preferably angles attached or welded along and beneath the funnel shaped piece 21 from the slit 29 to the opening at the lower end of the hopper 12. The guides 13 serve to align the slide gate 22. Slide gate 22 may have an outer edge 28 formed for ease of pushing and grasping, and an inner edge 31 tapered to, for example, a fifteen degree angle to prevent catalyst particles from blinding off the opening. FIG. 4 represents the slide gate 22 as if the outer edge 28 were straightly aligned and as if the inner edge 31 were slightly skewed (in actuality it cannot be both straight and skewed at the same time).

A baffle 40 (see FIG. 4) may be mounted within the hopper 12. The baffle 40 shares the weight of the catalyst in the hopper 12 keeping the full weight off of the slide gate 22. This allows the slide gate 22 to vibrate and helps in conducting the catalyst past the slide gate 22 and through the opening. The baffle 40 is a plate with a lower angled platform 44 (e.g. thirty degrees from the horizontal) projecting into the hopper 12 overlapping at least a portion of the opening in the lower end of the hopper 12. The upper end 41 may also be tapered/angled (e.g. thirty degrees from the vertical) to inhibit particulate from passing and lodging behind the baffle 40. The baffle 40 has a vertical slot 45 (e.g. three inches long) through the vertical intermediate portion of the baffle 40 for vertically adjusting the position of the baffle 40 within the hopper 12.

A box 11 is mounted below the hopper 12. The box 11 includes a top off chute 72 mounted along the top of the box 11 adjacent to the neck 19 of the hopper 12.

A primary ramp 26 is mounted in the box 11 underlapping the opening in the hopper 12. The primary ramp 26 has an angle of inclination and extends to a lower end of the box. Preferably the angle of inclination is adjustable is adjustable within a range of ten to thirty degrees from the horizontal. The primary ramp 26 has a screen 30 (method of allowing dust and fines to fall through for removal) which may be enclosed in a ramp frame. The mesh of the screen 30 in primary ramp 26 is preferably made of a perforated plate with ¼" holes punched there-through at ⅜" delta, or it could be a frame with a ¼" mesh screen attached there-to. Mesh smaller than ¼" does not allow sufficient dust and fines to pass through under current requirements.

A secondary ramp 34 may be mounted immediately below the receiving hopper 12 and within the box 11 underlapping the opening in the hopper 12 and overlapping the primary ramp 26. The secondary ramp 34 has an angle of inclination transverse to the primary ramp and extends to a position staggered over a leading edge of the primary ramp 26. The secondary ramp 34 carries the weight of the catalyst falling out of the receiving hopper 12 and transfers this catalyst to the primary ramp 26. The secondary ramp 34 is preferably fixed at a fifteen degree downward angle of inclination. The secondary ramp 34 may have a dogleg at the upper end (depicted in FIG. 1) extending up to one side of the opening in the hopper 12 to direct flow of catalyst onto the secondary ramp 34.

A collection cone 38 and transfer tube 42 are located at the base 27 or one end of the primary ramp 26. The collection cone 38 is connected to the box 11, and the transfer tube 42 is connected to the collection cone 38 through-which the catalyst is thereby conveyed through the loading funnel fitting 57 and the loading funnel 58 to the tube 46 to be filled.

A dust collection cone 50 and discharge port 54 are situated directly under (underlapping) the primary ramp 26 for all dust and fines that fall through the primary ramp 26 as this material is undesirable in the tubes 46. The dust collection cone 50 is connected to the box 11, and the discharge port 54 is connected to the dust collection cone 50.

The loading funnel 58 has a spout or opening. A removable tip or adaptor 60 is connected to the spout. A lip 59 circumscribes the removable tip 60. The removable tip 60 (which may be made of various sizes) with lip 59 is inserted into the top 47 of the tube 46 and is thereby adjustable to various tube 46 internal diameters. A support bar or bracket 62 which extends up to the lower rear 66 of the automated filling delivery device 10.

An electric or pneumatic vibrator 70 is preferably mounted on the box 11 to vibrate the box 11, hopper 12, etc. The device may also be vibrated by hand through use of, for example, the handles 20.

A loading system reset switch 80 connects to an arm 84 and locking eye hook 88 for hanging a tube loading system 100 on and a separate bracket 92 that acts as a stop for the arm 84 and thereby assisting in carrying the weight of the tube loading system 100 as it hangs. The reset switch 80 is preferably an ALLEN-BRADLEY proximity switch that is attached to the end of the box 11. The arm 84 is attached to the trunion on a side of the reset switch 80. The arm 84 turns the trunion to activate/deactivate the reset switch 80 when the line/rope of the tube loading system 100 is on the locking hook-eye 88.

An electronic control box 94 is attached to the side the box 11 containing the primary ramp 26. The electronic control box 94 contains a timer 95, relays 96*a*, *b*, *c*, circuit breaker 97, on/off switch 98 and engagement switch 99.

The device is operated in the following manner:

Prior to loading any catalyst, the automated filling delivery device 10 will need to be set up and tailored to the inner diameter ("i.d.") and volume of the tubes 46 to be loaded. Every tube 46 i.d. has a known volume associated with it. Following a chart of these i.d.'s and volumes, the adjustable receiving hopper 12 is set to allow for the filling of between thirty-six and forty-two inches of catalyst per filled hopper 12 by raising or lowering the hopper extension piece 14 via, for example, four slots 17 and locking it in place at the required volume with, for example, wing nuts 15*a* and bolts 15*b*. The lower end of the funnel 58 is fitted with a removable adaptor or tip 60 having lip 59 and a bolted fitting 61 matched to the i.d. of the tubes 46. Once fitted with the adaptor 60, the lower end of the funnel 58 is placed in the tube 46 to be loaded. A tube loading system 100 is inserted through the upper end of the funnel 58 and lowered into the tube 46. Once at the bottom, the tube loading system 100 is raised to the height required for the discharge of one hopper 12 full of catalyst and hung on the locking eye hook 88 on the arm 84 of the reset switch 80 for the tube loading system 100. The receiving hopper 12 is then filled with catalyst to the top and the lid 16 fully closed. The on/off switch 98 on the control panel box 94 is put in the "on" position.

For the first hopper 12 only of each different catalyst in each tube 46, first the arm 84 (upon which the tube loading system 100 is hung) is raised until the reset switch 80 is engaged and then lowered back down onto the bracket 92. The reset switches 18, 80, respectively, on the receiving hopper 12 and tube loading system 100 arm are connected to relays 96*a*, *b*, *c* in the control panel box 94 that allow the vibrator 70 to be energized by pushing the engagement switch 99 on the box 94. The timer 95 is either pre-set or set to automatically "turn off" the vibrator 70 and thereby shut down the automated filling delivery device 10 after a period of about seventy-five to one hundred and twenty seconds (as dictated by the parameters of the job to be performed). The timer 95 is strictly for the protection of the vibrator 70 to prevent unnecessary running of the automated filling delivery device 10 if left unattended.

Next, the slide gate 22 is opened and set/positioned (via for example a bolt 23 tractable through a mounting bracket 24 which allows the operator to fix the gate 22 which is moveable through a slit 29 through the hopper 12 wall) to allow the catalyst to discharge out of the receiving hopper 12 onto the secondary ramp 34 at a rate that allows for the hopper 12 to completely discharge in about sixty to ninety seconds depending on the i.d. of the tubes 46. The catalyst, due to vibration, travels down the secondary ramp 34 and discharges onto the primary ramp 26. The angle of inclination of the primary ramp 26 is adjusted up or down by loosening the wing nut 25b, sliding the bolt 25a attached to the hinge on the screen 30 (up or down) and then retightening the wing nut 25b to fine tune the timing for the unloading of the receiving hopper 12. Again, due to the vibration, the catalyst travels down the primary ramp 26 which has a screen 30 mounted in the center or is made of a known screening material. As the catalyst passes across the primary ramp 26, the dust and fines fall through the screen 30 under the influence of gravity where they are collected and transferred out of the automated filling delivery device 10 via the dust collection cone 50 and discharge port 54. The catalyst falls from the primary ramp 26 into the catalyst collection cone 38 toward the lower front end of the automated filling delivery device 10. On the bottom of the catalyst collection cone 38 is the catalyst transfer tube 42. The lower end of the transfer tube 42 is connected to the side of funnel 58 via, for example, a fitting 57. The catalyst travels down the transfer tube 42 into the funnel 58 and down into the tube 46 onto the tube loading system 100.

After the hopper 12 has emptied in the set time period, the lid 16 of the receiving hopper 12 is opened which trips the hopper reset switch 18 thereby disengaging the vibrator 70. The hopper 12 is again filled to the top and the lid 16 closed. The tube loading system 100 is then unlocked from the eye hook 88, raised up again the requisite height and reattached to the locking eye hook 88. The engagement switch 99 will now be allowed to energize the vibrator 70 once more thereby repeating the entire cycle. This procedure is followed until the level indicator flag (not shown) on the tube loading system 100 is visible in the funnel 58.

It is preferable to set the filling height of the hopper 12 so that the level indicator flag appears with a minimum amount of catalyst left to fill. The tube loading system 100 is then removed from the locking eye hook 88 and held in one hand of the operator. With the other hand, the operator takes a small amount of catalyst in a pail and slowly pours the catalyst into the "top off" chute 72 located on the upper front of the automated filling delivery device 10 directly above the vibrator 70. As the catalyst is slowly poured in, the tube loading system 100 is slowly lowered up and down so that it touches the catalyst that is settled in the tube 46. This allows the operator to ascertain how much catalyst is still required as it is poured in.

Last, after the level indicator flag on the tube loading system 100 is at the top of the funnel 58, the tube 46 has received the desired amount of catalyst for that level. The tube loading system 100 is then removed from the funnel. The automated filling delivery device 10 is pulled out of the tube 46 and placed into the next tube to be filled. One or more handles 20 attached to the automated filling delivery device 10 may be useful for this procedure. The tube loading system 100 is reinserted into the funnel 58 and the entire procedure is repeated with the exception of the set up of the hopper 12 volume, slide gate 22 and ramp 26 and 34 angle(s) which have already been set for the remainder of the loading operation.

The angle of inclination of the primary ramp 26 and secondary ramp 34 (as well as positioning of slide gate 22 and baffle 40) help determine the discharge time/rate into the tubes. A steep/high angle relates to a faster or more rapid loading speed, and a low angle a slower speed (although the secondary ramp 34 is preferably fixed since it generally has no or negligible bearing on loading speed).

The above procedure and design of the automated filling delivery device 10 have evolved from many prototypes developed over several months. The tube loading systems 100 that have been used in conjunction with the automated filling delivery device 10 have been the SOFTLOAD and UNIDENSE filling methods available from Catalyst Services, Inc. although any functional tube loading system 100 may be implemented. Several technicians have operated the automated filling delivery device 10 with very consistent and predictable results which was the ultimate goal of developing the automated filling delivery device 10 in the first place, removing as much as possible the human factor from the loading of catalyst into tubes.

What is claimed is:

1. An apparatus for automating delivery of a particulate to a tube contained in a reformer type heater with vertical tubes, comprising:
    a hopper having an opening at the lower end;
    a gate mounted on the hopper selectively projecting over the opening in the hopper;
    a box mounted below the hopper;
    a primary ramp mounted in the box underlapping the opening in the hopper wherein said primary ramp has an angle of inclination and extends to a lower end of the box;
    wherein said primary ramp includes a means for allowing dust and fines to fall through said primary ramp;
    a means for conveying the particulate to a tube loading adaptor, the means for conveying the particulate being connected to the box proximate to one end of said primary ramp;
    a means for collecting dust and fines connected to the box underlapping said primary ramp;
    wherein the tube loading adaptor is positioned for connection to the tube in the reformer type heater with vertical tubes; and
    a means for moving the particulate connectable to the apparatus for automating delivery of the particulate.

2. The apparatus according to claim 1, further including a lid hinged to a top end of the hopper.

3. The apparatus according to claim 2, further including a control system, the control system comprising:
    a means communicating with a reset switch mounted on the hopper for contact with the lid;
    a means communicating with the means for moving the particulate wherein the means for moving the particulate comprises a means for vibrating the box;
    a means communicating with a means for suspending, raising and lowering a tube loading system in the tube of the reformer type heater with vertical tubes, wherein the means for suspending, raising and lowering is positioned above the tube loading adaptor and runs internal to the tube loading adaptor; and
    at least one timer in the control system.

4. The apparatus according to claim 1, further including a hopper extension piece connected to the hopper wherein said hopper extension piece comprises a chute having vertical slots.

5. The apparatus according to claim 4, further including a lid hinged to a top end of said hopper extension piece.

6. The apparatus according to claim 1, further including a baffle mounted within the hopper and at least partially projecting over the opening in the hopper.

7. The apparatus according to claim 6, wherein said baffle includes a lower angled platform for projecting over at least a portion of the opening.

8. The apparatus according to claim 6, wherein said baffle has a vertical slot for vertically positioning said baffle within the hopper.

9. The apparatus according to claim 1, wherein the hopper has a funnel shaped piece at the lower end, the funnel shaped piece defining the opening at the lower end of the hopper; and further including two guides attached along and beneath the funnel shaped piece for receiving and positioning the gate as a slide gate.

10. The apparatus according to claim 9, wherein the hopper has a horizontal slit aligned with the two guides;

wherein the slide gate is mounted through the horizontal slit and projects outside of the hopper for adjusting and fixing the position of the slide gate.

11. The apparatus according to claim 10, further including a mounting bracket attached to the hopper and a bolt tractable through the mounting bracket positioned for selectively fixing the position of the slide gate.

12. The apparatus according to claim 1, wherein the box includes a top off chute mounted along the top of the box and adjacent to the hopper.

13. The apparatus according to claim 1, further including a secondary ramp mounted within the hopper and within the box underlapping the opening in the hopper and overlapping said primary ramp wherein the secondary ramp has an angle of inclination transverse to said primary ramp and extends to a position staggered over a leading edge of said primary ramp.

14. The apparatus according to claim 13, wherein the secondary ramp includes an angled end piece extending up to one side of the opening in the hopper.

15. The apparatus according to claim 13, wherein the angle of inclination of the secondary ramp is fixed at 15 degrees downward.

16. The apparatus according to claim 1, wherein the angle of inclination of said primary ramp is adjustable.

17. The apparatus according to claim 1, wherein the angle of inclination of said primary ramp is preferably in the range of from 10 degrees to 30 degrees from the horizontal.

18. The apparatus according to claim 1, wherein said means for allowing dust and fines to fall through said primary ramp comprises a screen.

19. The apparatus according to claim 18, wherein the screen has a mesh size of at least one-quarter inch.

20. The apparatus according to claim 1, wherein said means for conveying the particulate to a tube loading adaptor comprises a cone and a tube connected to the lower end of the cone.

21. The apparatus according to claim 1, wherein said means for collecting dust and fines comprises a dust collection cone and a discharge port connected to the lower end of the dust collection cone.

22. The apparatus according to claim 1, wherein the tube loading adaptor comprises a means for adjusting to the inner diameter of the tube in the reformer type heater with vertical tubes.

23. The apparatus according to claim 22, wherein said means for adjusting to the inner diameter of the tube in the reformer type heater with vertical tubes comprises:

a funnel having a spout;

a removable tip connected to the spout; and a lip circumscribing the removable tip.

24. The apparatus according to claim 22, wherein said means for adjusting to the inner diameter of the tube in the reformer type heater with vertical tubes further includes a support attached between the box and said means for adjusting to the inner diameter of the tube in the reformer type heater with vertical tubes.

25. The apparatus according to claim 1, wherein the means for moving the particulate comprises a means for vibrating the box, wherein the vibrating means comprises a vibrator selected from the group of vibrators consisting of an electric vibrator, a pneumatic vibrator, and a human hand.

26. The apparatus according to claim 1, further including a means for suspending, raising and lowering a tube loading system in the tube of the reformer type heater with vertical tubes, wherein the means for suspending, raising and lowering is positioned above the tube loading adaptor and runs internal to the tube loading adaptor.

27. A method for automatically delivering a particulate to a plurality of tubes contained in a reformer type heater with vertical tubes, comprising the steps of:

feeding a measured volume of the particulate at a controlled rate;

screening the particulate allowing dust and fines to fall out of the main flow stream of particulate;

collecting the dust and fines;

conveying and directing the main flow stream of particulate into the plurality of tubes in the reformer type heater with vertical tubes.

28. The method according to claim 27, wherein said steps of feeding, screening, collecting and conveying are accomplished by vibrating and gravitationally moving the particulate.

29. The method according to claim 27, further including:

positioning an apparatus for automating delivery of the particulate proximate to an individual reactor tube to be filled;

connecting to the individual reactor tube prior to said feeding step; and dispensing the measured catalyst into the individual reactor tube to be filled and onto a tube loading system located within the individual tube of the reformer type heater with vertical tubes to be filled.

* * * * *